W. D. MOUNT.
DRIVE FOR CONVEYERS.
APPLICATION FILED APR. 23, 1912.
1,032,850.
Patented July 16, 1912.
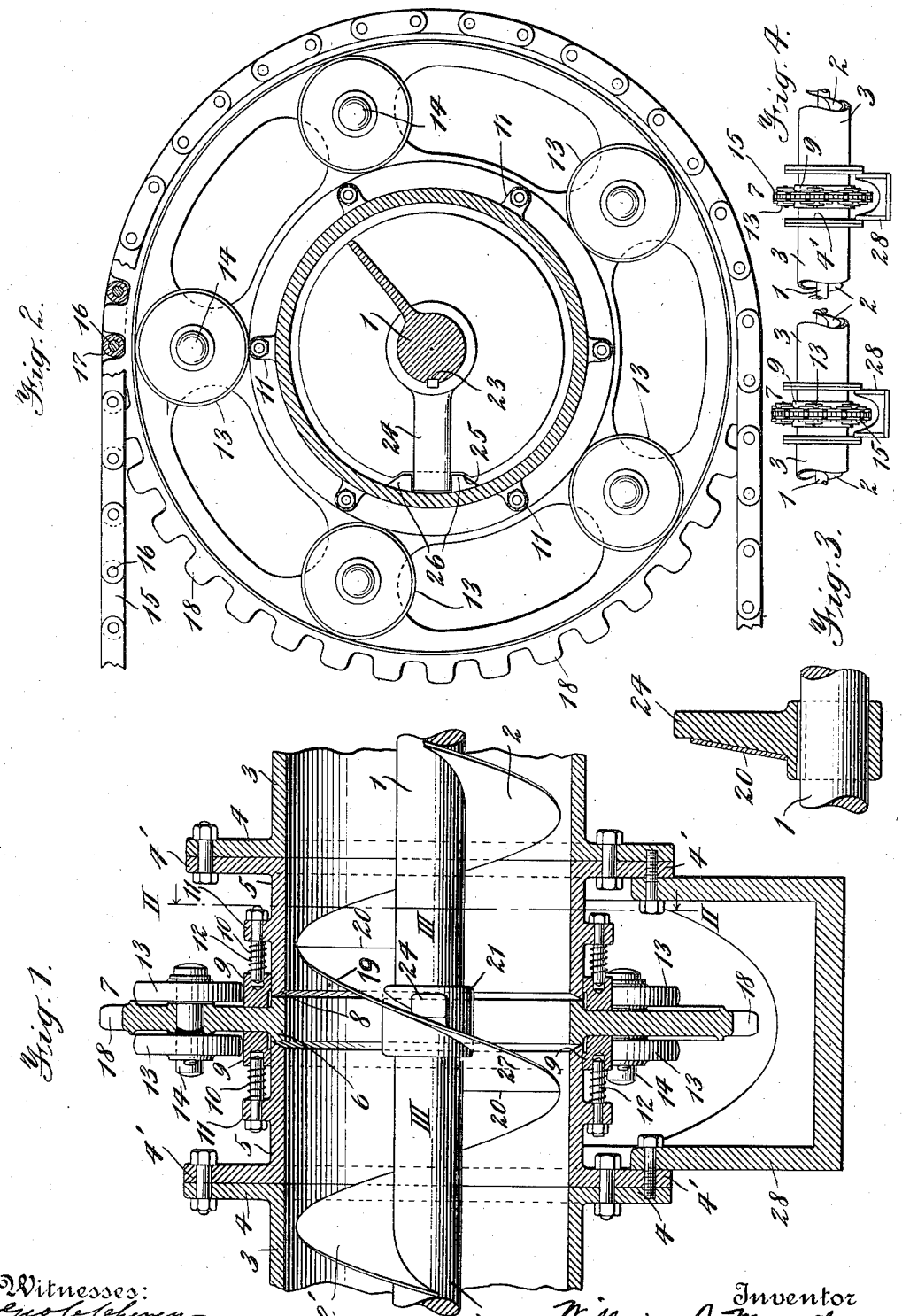

UNITED STATES PATENT OFFICE.

WILLIAM D. MOUNT, OF SALTVILLE, VIRGINIA.

DRIVE FOR CONVEYERS.

1,032,850. Specification of Letters Patent. Patented July 16, 1912.

Application filed April 23, 1912. Serial No. 692,693.

*To all whom it may concern:*

Be it known that I, WILLIAM D. MOUNT, a citizen of the United States, residing at Saltville, in the county of Smyth and State of Virginia, have invented certain new and useful Improvements in Drives for Conveyers, of which the following is a full, clear, and exact description.

This invention relates to conveyers and more particularly to a novel means for driving the same.

The drive in question is particularly adapted for use in connection with screw conveyers, which are frequently of considerable length and which, in so far as applicant is aware, have hitherto been driven solely from the ends thereof. When such a conveyer is driven from one end, a considerable torque is produced in the shaft which is apt to result in a break-down if, for example, the conveyer channel happens to become clogged and which, in any case, is objectionable from a mechanical standpoint.

The principal object of the present invention therefore is to afford means for rotarily driving a conveyer shaft, for example, and preferably that of a screw conveyer, from one or more points intermediate the length thereof.

I have further sought to accomplish the object just mentioned in such a manner as to expend in friction a minimum amount of work.

Still another object is to provide a mechanism which shall be simple in construction and inexpensive to manufacture.

I further aim to provide means for preventing leakage of material when the latter is being conveyed past the point where the drive is positioned.

These and other objects of my invention will be hereinafter referred to and the novel elements and combination of elements whereby they may be obtained will be more particularly set forth in the claims appended hereto.

In the accompanying drawings which form a part hereof and in which like characters designate similar parts throughout the several views, I have exemplified a preferred construction. It is to be understood, however, that I do not wish to be limited in any way to the device shown since I am aware that various changes and modifications may be made within the purview of my invention and without departing from the spirit thereof. I hence desire to be limited only by the scope of the said claims.

Referring to the drawings: Figure 1 is a vertical longitudinal section of a fragment of a screw conveyer with my novel drive in position therein. Fig. 2 is a transverse section taken on the line II—II of Fig. 1. Fig. 3 is a fragmentary detail section taken on the line III—III of Fig. 1. Fig. 4 is a diagrammatic representation of an extended conveyer.

The conveyer shaft designated 1 carries the usual screw 2—2' secured thereupon in any suitable manner. Suitable fixed casings or pipes 3 are disposed concentrically around the screw in a well known manner; sufficient clearance, of course, being provided between the screw and its inclosing or casing parts. These pipes or casings may be provided with flanges 4; and to each of the flanges 4 in the present instance, is bolted a gland-shaped member or casing part 5, which is in reality merely a continuation of the adjacent pipe 3; the body of each member 5 having preferably the same interior diameter as that of the pipes 3. The casing parts 5 are extended toward each other but are separated by the hub 6 of a hollow sprocket wheel broadly designated 7.

I have elected to show a sprocket wheel by way of exemplification, but it is obvious that the invention is not to be limited thereto since many other forms of drive may be employed.

The edge of each of the members or casing parts 5 which abuts against the said hub 6 is preferably beveled slightly as at 8, so that the engaging surfaces between these elements are in effect, merely lines. Mounted upon each of the members 5 is a bearing ring 9, adapted to fit quite snugly around the member upon which it is seated, but being longitudinally displaceable thereover through the instrumentality of a plurality of springs 10, the inner extremities of which abut against lugs 11 which project outwardly at spaced intervals from the surface of the members 5, while the inner extremities of said springs bear directly against the lateral surfaces of the rings 9. Springs 10 preferably encircle studs 12 which are secured in the said lugs and the free ends of which project into correspondingly shaped recesses in the rings 9. These pins serve to hold the bearing rings against rotation but permit the aforesaid longitudinal displacement of the same with respect to the members 5. The lateral surface of each ring 9 bears snugly against the body of the sprocket wheel, preferably immediately beyond the hub thereof, and it may be here noted that one of the functions of said rings is to prevent the escape of material, which may be traveling through the conveyer, as the said material passes through the sprocket wheel in question.

As a matter of fact, the interior or bore of the sprocket wheel hub constitutes a part of the conveyer casing; but while all other portions of this casing are normally stationary, this section thereof will be rotated continuously in one direction. The sprocket wheel is centered with respect to the shaft 1 by means of a plurality of rollers 13 or the like which bear against the outer surfaces of the rings 9; said rollers preferably being disposed in pairs, as shown, each pair of rollers being mounted upon a common bearing pin 14 carried by the sprocket wheel, and disposed upon the respective sides thereof.

The sprocket wheel may be driven by a chain 15 in the usual manner; the cross pins 16 of this chain being provided with rollers 17, or the like, which ride in the spaces between the teeth 18 of the sprocket wheel.

The sections 2—2' of the screw or propeller are joined by a screw section 19 of corresponding pitch and general configuration which is secured to the shaft 1 and to the said sections 2—2' in any suitable manner; and the parts of the screw may further, if desired, be made integral by welding along the lines 20, or in any other suitable manner.

Within the screw section 19, and also preferably secured thereto, is a collar 21 which may be keyed upon the shaft 1 as at 23. Outwardly projecting from this collar is a stem or arm 24 which in the preferred construction is shaped on one side thereof, as shown in Fig. 3, to conform closely to the adjacent screw section 20; the latter being recessed at the edge thereof as at 25. The extremity of the arm 24 projects out into this recess and is in engagement with a pair of interiorly directed driving lugs 26 in the bore of the rotary member or wheel 7 above referred to.

The arm 24 is preferably made separate and distinct from the section of the conveyer screw immediately adjacent thereto since the screw is usually made of relatively thin material such as sheet metal; and it will be observed that by reason of the construction shown, the working face, which in the present instance is that designated 27, of the conveyer is left perfectly smooth, the arm extending outwardly upon the rear or non-working face of the screw. The material urged along by the screw hence encounters no obstruction and the screw twists therethrough unimpededly.

It is to be understood, of course, that the conveyer sections are preferably rigidly mounted and I have indicated in Fig. 1 a means for supporting the extremities of these casings and the intermediate casing parts and drive mechanism. As shown herein, the flanges 4' of the casing parts 5 are bolted to a common base 28 which maintains said parts in spaced relationship.

The operation of the device is as follows: Assuming that material is to be conveyed through the casing 3 by means of the screw in the usual manner, the latter may have a rotary movement imparted thereto at any point or points along its length by incorporating the herein described drive mechanism in the conveyer line at such point or points. The sprocket wheel 7, or its equivalent, will be driven by the chain 15 and will rotate smoothly and concentrically with respect to the shaft 1 by reason of the engagement of the rollers 13 with the rings 9. These latter will, of course, be always lightly engaged frictionally with the sides of the sprocket wheel, so that by practically no possibility can material which is ordinarily conveyed by means of a screw conveyer leak out around the said wheel. Furthermore, any wear which may occur between the rings 9 and the sprocket wheel will be taken up automatically by the springs 10. The sprocket wheel 7 carries around with it the arm 24 by reason of the engagement of the extremity of the latter with the driving lugs 26 and this arm in turn rotates or drives the screw shaft by means of the collar 21.

In general it will be seen that the mechanism in question is exceedingly simple in principle and in practice has been found to efficiently overcome the disadvantages encountered where it has been attempted to drive a long screw conveyer from one or even both ends of its screw shaft.

The novel construction herein described may be used both as an intermediate and auxiliary drive, or as a primary drive, and may be emplaced in a conveyer line wherever needed. It further permits of the successful operation of a continuous screw conveyer of a length which by present methods, driving from one or both ends, would be entirely impracticable.

I particularly call attention to the fact that not only are the lengths to which the conveyer may be extended practically unlimited; but, further, that the flights are uninterrupted and continuous, despite the fact that it may be driven from a plurality of spaced points along its length. In other words, the introduction of a drive wherever desired in no way renders the conveyer discontinuous, so that there is no interference with the normal flow of the material conveyed thereby.

The advantage of thus driving a conveyer from a plurality of points along the length thereof, as shown in Fig. 4, is, of course, obvious, and reduces the liability of breakage of the conveyer shaft to a minimum. It further has the advantage of obviating the necessity of shutting down or stopping the operation of the conveyer as a whole should such breakage occur at some point along the length of the same. Again, even if a shaft does break at some point intermediate the length of an extended conveyer, the broken portions thereof may still be rotated independently of the respective adjacent drives.

Having thus described my invention, what I claim is:

1. The combination of a conveyer comprising relatively fixed casing parts and a rotatable propelling structure therein adapted to shift material to be conveyed, longitudinally through said casing parts, with means for rotarily driving said propelling structure, said means being positioned intermediate the extremities of said conveyer and including a driving member, means for rotarily mounting said member, and connections between said member and said structure.

2. The combination of a conveyer comprising relatively fixed casing parts and a rotatable propelling structure therein adapted to shift material to be conveyed, longitudinally through said casing parts, with means for rotarily driving said propelling structure, said means being positioned intermediate the extremities of said conveyer and including a driving member, means for rotarily mounting said member, and connections between said member and said structure, a portion of said driving means being disposed between two of said relatively fixed casing parts.

3. The combination of a conveyer comprising substantially alined but spaced casing parts and a rotatable propelling structure therein adapted to shift material to be conveyed, longitudinally through said casing parts, with means for rotarily driving said structure, a portion of said driving means being disposed between said spaced casing parts, and means for substantially preventing leakage of said material through the space between said casing parts.

4. The combination of a conveyer comprising spaced casing parts and a rotatable propelling structure therein adapted to shift material to be conveyed, longitudinally through said casing parts, with means for rotarily driving said structure, said means including a member a portion of which is disposed between said casing parts and revoluble with respect to the same, and frictional means for substantially preventing leakage of said material between said member and said casing parts.

5. The combination of a conveyer comprising spaced casing parts and a rotatable propelling structure therein adapted to shift material to be conveyed, longitudinally through said casing parts, with means for rotarily driving said structure, said means including a member a portion of which is disposed between said casing parts and revoluble with respect to the same, and resiliently acting frictional means for substantially preventing leakage of said material between said member and said casing parts.

6. The combination of a conveyer comprising spaced casing parts and a rotatable propelling structure therein adapted to shift material to be conveyed, longitudinally through said casing parts, with means for rotarily driving said structure, said means including a member a portion of which is disposed between said casing parts and revoluble with respect to the same, and yielding means for substantially preventing leakage of said material between said member and said casing parts.

7. In conveying apparatus, a series of casing parts, two of which are relatively fixed and one of which is revolubly mounted and disposed between said two relatively fixed parts, means for rotating said revolubly mounted part, a rotatable propelling structure common to the fixed and rotatable casing parts above referred to and adapted to shift material to be conveyed, successively through said parts, and connections between said structure and said revolubly mounted casing.

8. In conveying apparatus two spaced apertured casing parts, a wheel rotarily mounted therebetween, said wheel having a central aperture therethrough substantially corresponding to the apertures in said casing parts, means for holding the aperture through said wheel in alinement with the apertures in said parts, said means including a plurality of revoluble friction reducing elements, means for propelling material through said casing parts, and connections between said last mentioned means and said wheel.

9. In conveying apparatus two spaced casing parts, a member rotarily mounted therebetween, said member being centrally apertured to permit of the passage of material to be conveyed from one of said casing parts to the other, means for propelling said material through said member, connections between said propelling means and said member, and means for centering said member with respect to said casing parts.

10. In conveying apparatus two spaced casing parts, a member rotarily mounted therebetween, said member being centrally apertured to permit of the passage of material to be conveyed from one of said casing parts to the other, means for propelling said material through said member, connections between said propelling means and said member, and means for supporting said member upon said casing parts, said supporting means including friction reducing elements.

11. In conveying apparatus two spaced casing parts, a member rotarily mounted therebetween, said member being centrally apertured to permit of the passage of material to be conveyed from one of said casing parts to the other, means for propelling said material through said member, connections between said propelling means and said member, and means for supporting said member upon said casing parts, said supporting means including rollers carried by said member, and roller-engaging bearing rings carried by said casing parts.

12. In conveying apparatus two spaced casing parts, a member rotarily mounted therebetween, said member being centrally apertured to permit of the passage of material to be conveyed from one of said casing parts to the other, means for propelling said material through said member, connections between said propelling means and said member, and closure providing means adapted to co-act with said member and said casing parts for substantially preventing leakage of said material therebetween.

13. In conveying apparatus two spaced casing parts, a member rotarily mounted therebetween, said member being centrally apertured to permit of the passage of material to be conveyed from one of said casing parts to the other, means for propelling said material through said member, connections between said propelling means and said member, and closure providing means adapted to co-act with said member and said casing parts for substantially preventing leakage of said material therebetween, said closure providing means including yieldingly mounted rings.

14. In conveying apparatus two spaced casing parts, a member rotarily mounted therebetween, said member being centrally apertured to permit of the passage of material to be conveyed from one of said casing parts to the other, means for propelling said material through said member, connections between said propelling means and said member, closure providing means adapted to co-act with said member and said casing parts for substantially preventing leakage of said material therebetween, said closure providing means including yieldingly mounted bearing rings, and rollers carried by said member and in engagement with said bearing rings.

In witness whereof, I subscribe my signature, in the presence of two witnesses.

WILLIAM D. MOUNT.

Witnesses:
 CHAS. E. WILEY,
 PALMER ST. CLAIR.